Sept. 11, 1962    D. GOLDMAN    3,053,106
HYDRAULIC NUTS
Filed Dec. 27, 1960    2 Sheets-Sheet 1

*INVENTOR.*
DANIEL GOLDMAN
BY
*Hauke & Hauke*
ATTORNEYS

Sept. 11, 1962          D. GOLDMAN          3,053,106
HYDRAULIC NUTS
Filed Dec. 27, 1960          2 Sheets-Sheet 2

INVENTOR.
DANIEL GOLDMAN
BY
*Hauke & Hauke*
ATTORNEYS

United States Patent Office 3,053,106
Patented Sept. 11, 1962

3,053,106
HYDRAULIC NUTS
Daniel Goldman, Oak Park, Mich., assignor to Tracer Control Company, Hazel Park, Mich., a corporation of Michigan
Filed Dec. 27, 1960, Ser. No. 78,375
6 Claims. (Cl. 74—441)

The present invention relates to screw driven machines and mechanisms and more particularly to the lead screw and nut assembly of such machines and mechanisms. This invention presents marked advantages over ordinary screw and nut assemblies by using hydraulic fluid pressure to continuously maintain the nut thread in contact with the screw thread.

In screw-driven machines and mechanisms, rotary motion is ordinarily applied to the screw. This rotary motion of the screw forces the nut to travel along the axis of the screw, by converting rotary force and motion to linear force and motion. In some applications the screw, instead of the nut, may be forced to travel. This is accomplished by applying rotary motion to the nut and at the same time preventing it from traveling along the axis of the screw, and by allowing the screw to travel along its axis; the screw can also be forced to travel along its axis if the nut is maintained in a fixed position and rotary motion is applied to the screw.

The screw and the nut must necessarily be accurately cut and ground, because the overall accuracy and precision of the entire machine or mechanism is directly dependent upon the quality of the screw and nut assembly. The clearance between the screw and the nut threads must be as small as possible and at the same time be sufficient to allow the screw and the nut to rotate in relation to each other without excessive friction. This friction causes backlash in the screw and nut assembly, and this objectionable backlash increases as the threads wear with use of the machine or mechanism. Means must therefore be provided to take up this excessive clearance due to wear of the screw and nut assembly.

One object of the present invention is to provide a screw and nut assembly for a machine which is exempt from backlash, thereby eliminating objectionable vibrations, chatter and the resulting bad surface finish of the work.

Another object of the present invention is to provide a screw and nut assembly for machines and mechanisms which have an automatic play and wear take-up.

Another object of the invention is to provide this screw and nut assembly with an automatic and continuous brake, the amount of braking force being determined by the amount of hydraulic pressure being supplied to the screw and nut assembly. This automatic and continuous brake is a highly desirable feature as the rotating part is prevented from further rotary motion as soon as torque is no longer applied upon it, and the elements are securely locked into this position as long as no power is being applied.

Still another object of the invention is to provide a precise positioning or indexing of related components whose relative positions are determined or measured by the amount of turning of a screw with respect to a nut.

Still another object of the invention is to provide a precise feeding of the tool or the work, or both, in a machine tool.

From the foregoing objects and advantages, it can be seen that the present invention can be incorporated in machines such as lathes, screw machines, milling machines, shapers, lapping machines, grinders, boring machines, jig borers, screw presses and the like.

The invention can also be used on measuring, indexing, telemetering instruments and apparatuses, and the like, and on the control mechanisms of telescopes, radar tuners, electronic machinery, aircraft and boat controls, missile and rocket guidance systems, and the like.

The above examples of applications of the present invention are given for illustrative purpose only, and many other applications could be devised without departing from the scope and objects of the invention.

In illustrating the invention, the screw and nut assembly is represented as consisting of a screw, generally called the leadscrew, which is prevented from traveling along its axis, and of a nut which is forced to travel along the screw axis when rotary force and motion are applied to the screw. It is to be understood that the illustration and disclosure of the invention made herein is for the purpose of explaining the same so that those skilled in the art may practice it, and that changes and modifications, such as requiring the nut to remain in a fixed position thereby causing the screw to travel, may be made within the scope of the invention as set forth in the appended claims.

In the drawings, FIGS. 1 to 4 show one embodiment of the present invention, in which like numerals refer to like parts. FIGS. 5 and 6 represent two other embodiments of the invention.

Figure 1:
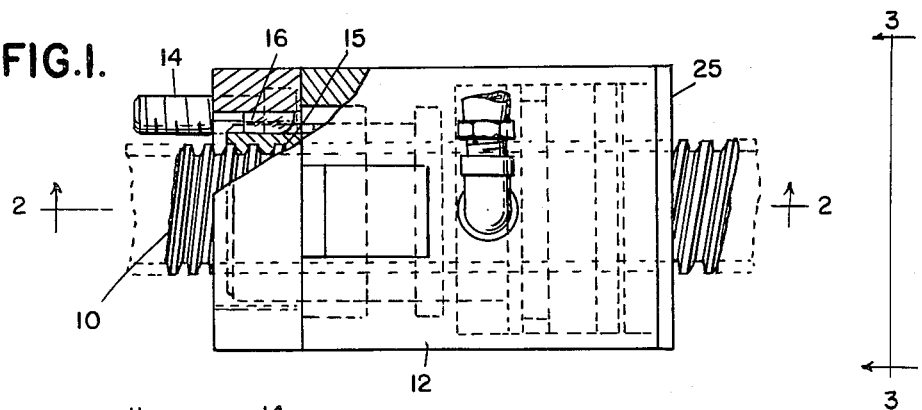
FIG. 1 is a side elevational view of the invention, with a portion shown broken away.
Figure 2:
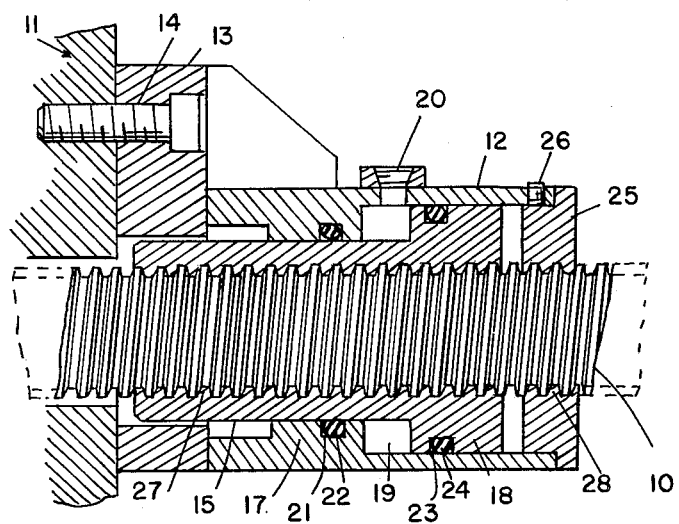
FIG. 2 is a cross sectional view taken substantially along line 2—2 of FIG. 1.
Figure 3:
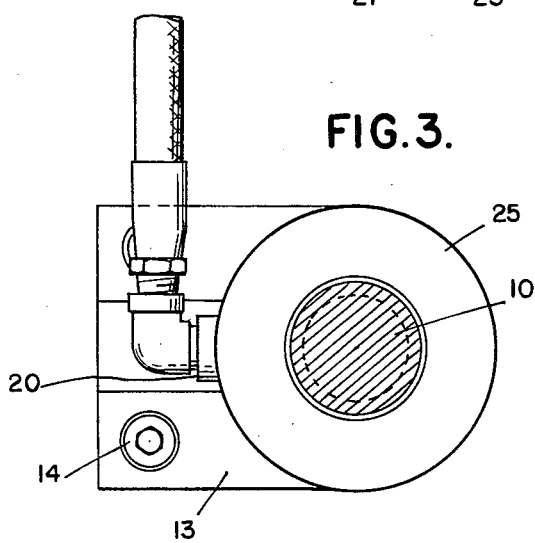
FIG. 3 is an end view from line 3—3 of FIG. 1.

In the form of the invention shown in FIGS. 1 to 4 inclusive, numeral 10 represents the leadscrew and numeral 11 represents the housing of the carriage, slide or part of the machine or mechanism whose linear travel is being controlled by the amount of rotary motion of the screw 10.

A shell 12 is a substantially cylindrical member disposed preferably concentric to the screw 10 and adapted for mounting upon the housing 11 by being provided with a bracket 13 and appropriate fastening bolts 14 or other means. A stepped inner annular shoulder portion is provided on the inside bore of the shell 12 as indicated by numeral 17.

Slidably mounted within the shell 12 and substantially concentric to both the shell 12 and the screw 10 is a barrel-like tubular insert 15 provided on its internal bore with a thread 27 adapted to receive the screw 10. A key 16 prevents any rotary motion of the insert 15 while permitting it to slide longitudinally along its common axis with the screw 10 and the shell 12. The main diameter of the outer surface of the insert 15 is such as to slideably fit within the bore of shoulder portion 17. The insert 15 is provided with an outwardly extending annular shoulder portion 18, whose diameter is such as to slideably fit within the larger bore of the shell 12. An annular space is thus caused to exist between the shoulder portions 17 and 18 as illustrated at 19, and this annular space or chamber is filled by fluid under pressure introduced through a passage 20. O ring gaskets or pressure seals 22 and 24 are preferably retained in annular grooves 21 and 23 to prevent leakage of the fluid contained within the annular chamber 19.

The open end of the shell 12 has a substantially thick disk-like closure ring 25 fastened by set screws 26, or the like. The inner bore of the ring 25 has a thread 28 adapted to receive the screw 10.

In some machines, there will be some other internally threaded part coacting with the screw 10 which will serve the same purpose as the threaded ring 25.

In operation, the annular chamber 19 is filled with an uncompressible fluid under pressure. The threaded insert 15 is thus urged axially in one direction, as indicated by the arrow in FIG. 4, and its thread 27 applies longitudinal pressure upon one side of the thread of the screw 10 as shown at 27a. At the same time the shell 12 and consequently the ring 25, or other threaded part of the machine, will exert force or pressure axially in the opposite direction applying longitudinal pressure upon the other side of the thread of the screw 10 as shown at 28a of FIG. 4.

When the screw 10 is rotated in the direction that causes its thread to exert axial force upon the side of the thread of the insert 15 indicated as at 27a, the insert 15 is urged to travel longitudinally in a direction that tends to decrease the volume of the annular chamber 19. As the fluid filling the chamber 19 is uncompressible, the axial force is transmitted to the shell 12 which is thus caused to travel linearly along its axis for the same distance as the insert 15 is being caused to travel. This of course results in a similar and corresponding linear displacement of the housing 11.

When the screw 10 is rotated in the opposite direction, its thread exerts axial force upon the side 28a of the thread 28, thus causing the ring 25 to travel longitudinally. The shell 12 and the housing 11 being secured to the ring 25 are thereby caused to travel in the same direction as the ring 25.

Consequently, to any rotary motion of the screw 10 corresponds a linear motion of the housing 11 in one direction or the other. This linear motion takes place without any lost motion or backlash. Play due to wear of the thread is automatically compensated for by more fluid being introduced into the annular chamber 19 to continuously maintain the helical surfaces of the threads 27 and 28, at 27a and 28a, in contact with the corresponding sides of the thread of screw 10. Furthermore, because of this continual pressure exerted upon the helicoidal surfaces in contact, the screw 10 is immediately braked to a stop as soon as no torque is any longer applied to it, and the respectivel components remain safely locked in position until torque is again applied to the screw 10.

Figure 5:
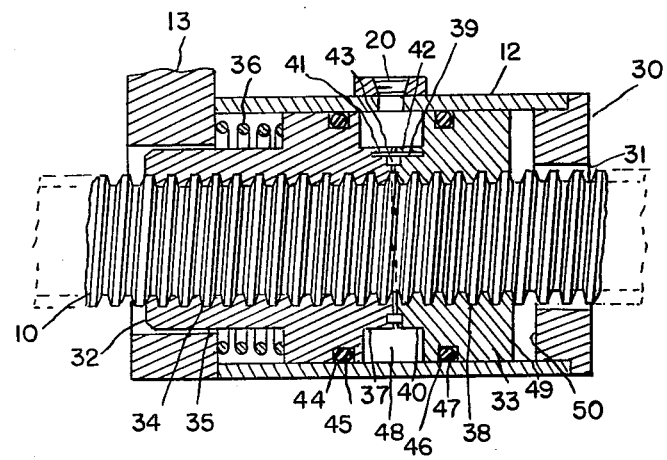
FIG. 5 is a cross sectional view similar to FIG. 2 and showing another embodiment of the invention.

Referring now to FIG. 5, which illustrates another embodiment of the invention, numeral 10 represents the lead-screw and numeral 12 represents the substantially cylindrical shell concentric to the axis of the screw 10 and provided with a smooth inner bore. The shell 12 is provided on one end with a bracket 13 for mounting upon the carriage, slide or part whose travel is being controlled by rotary motion of the screw 10. The other end of the shell 12 is obturated by a substantially thick disk-like closure ring 30 fastened to the shell 12 by setscrews or the like, and which has an inside bore 31 of a diameter slightly greater than the outside diameter of the screw 10.

Disposed substantially concentrically to both the shell 12 and the screw 10 and positioned within the shell 12 are piston-like inserts 32 and 33. The insert 32 has an inner bore with a thread 34 adapted to mesh with the thread of the screw 10 and its larger outer diameter is slightly smaller than the iner bore of the shell 12 so as to slideably fit within said shell 12. The insert 32 is undercut on its outer end closest to the bracket 13, as shown at 35, in order to make room for a spacer coil spring 36. The insert 32 is keyed to the shell 12, so as to be prevented from rotary motion while being allowed to slide longitudinally along its axis. The end of the insert 32 farthermost from the bracket 13 has another undercut outer diamter 37.

The insert 33 has an inner base with a thread 38 adapted to mesh with the thread of the screw 10. The outer diameter of the insert 33 is slightly smaller than the inner bore of the shell 12 so as to slideably fit within said shell 12. The insert 33 is secured to insert 32 by means of pins 39 or the like which render both inserts unable to rotate in relation to one another while allowing them limited relative motion independently of one another along their common longitudinal axis. The end of the insert 33 closest to the insert 32 has its outer diameter undercut as shown at 40.

Circular grooves 41 and 42 are cut on the adjoining faces of the inserts 32 and 33 and in the space thus provided is retained O ring gaskets or seals 43. On their outer diameters, the inserts 32 and 33 have annular grooves 44 and 45 with O ring gaskets or seals 45 and 47. These gaskets or seals prevent any leakage from the annular chamber 48, formed by undercuts 37 and 40, of the fluid under pressure introduced into the annular chamber through the port 20.

In operation, the annular chamber 48 is filled by fluid under pressure. The inserts 32 and 33 are thus forced apart and act in combination as a unit nut without backlash and with automatic wear take up as described above in the embodiment of FIGS. 1 to 4. The spring 36 is designed with enough stiffness to maintain the face 49 of the insert 33 in contact with the face 50 of the ring 30. Therefore, when moving linearily in one direction the insert 33 pushes against the ring 50, thus forcing the shell 12 to travel in the same direction. When the insert 32 is urged in the other direction by an opposite rotation of the screw 10, the insert 32 causes the spring 36 to communicate this linear motion to the shell 12 and the bracket 13.

Figure 6:
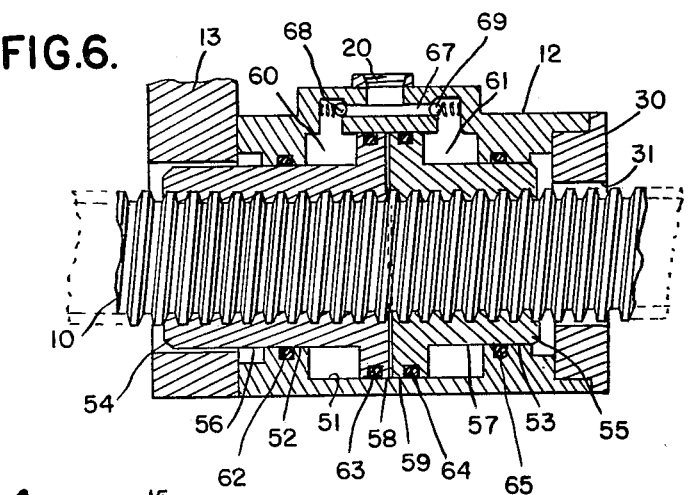
FIG. 6 is a cross sectional view similar to FIG. 2 and showing still another embodiment of the invention.
Figure 4:
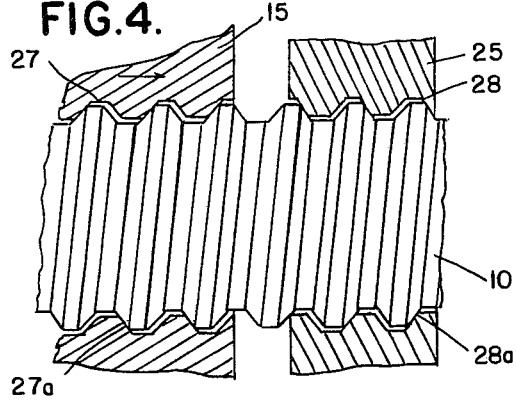
FIG. 4 is a detailed view of a portion of FIG. 2 with component parts shown in an enlarged and relative positioning to illustrate the principle of the invention.

In the embodiment of FIG. 6, the shell 12 is similarly adapted to receive within its bore two piston-like threaded inserts 54 and 55. The shell 12 has an inner bore 51 delimited on both ends by shoulder-like smaller bores 52 and 53. On their abutting faces the inserts 54 and 55 have step-like shoulders 58 and 59 of an outside diameter so as to slideably fit within the bore 51. Two annular chambers 60 and 61 are thus caused to exist as illustrated and are sealed against leakage by O ring gaskets or pressure seals 62, 63, 64, and 65. The two annular chambers communicate with each other through a manifold 67 and are filled by fluid under pressure supplied through the port 20. The insert 54 is keyed to the shell 12 and the inserts 54 and 55 are fastened together as previously described in embodiment of FIG. 5.

In operation, both annular chambers 60 and 61 are filled by fluid under pressure. The inserts 54 and 55 are thus forced closer together and act in combination as a unit nut without backlash and with automatic wear take up as described above in the embodiment of FIGS. 1 to 4. When the screw 10 is rotated in the direction which by the corresponding linear displacement of the insert 54, tends to decrease the volume of the annular chamber 60, this linear displacement of the insert 54 is transmitted to the shell 12 because the fluid filling the chamber 60 is uncompressible. When the screw 10 is rotated in the opposite direction, the insert 55 being caused to travel longitudinally tends to decrease the volume of the annular chamber 61. As the chamber 61 is filled with uncompressible fluid, the linear displacement of the insert 55 is transmitted to the shell 12. Check valves 68 and 69 placed in the manifold 67 preclude any transfer of fluid from one annular chamber to the other that would prevent the above described action from taking place.

It is to be understood that the invention is not limited to the specific embodiments herein illustrated and described, but may be used in other ways without departure from its spirit as defined by the following claims.

I claim:

1. An hydraulic nut for machines and the like adapted to linear travel in response to rotary motion of a leadscrew and comprising a hollow shell structure disposed substantially concentrically around said leadscrew, piston-like insert elements slideably disposed around said leadscrew within said shell structure and having an internal thread adapted to mesh with the thread of said leadscrew, fastening means between said insert elements and said shell structure permitting limited linear motion while preventing rotary motion of the insert elements within the shell structure, said insert elements and said shell structure being disposed in such a spaced relation as to form one annular chamber, sealing means to prevent leakage of fluid from said annular chamber, a source of uncompressible fluid under pressure, means to admit the fluid into said annular chamber to cause said fluid to exert a force upon said insert elements and said shell structure directed along their axes so as to cause their internal thread to exert a wedging action upon the thread of said leadscrew and means to communicate any linear motion of said insert elements to said shell enclosure.

2. An hydraulic nut assembly for machines and the like adapted to linear travel in response to rotary motion of a leadscrew and comprising a hollow shell structure disposed substantially concentrically around said leadscrew and having a shouldered internal bore of two different diameters, a disk-like closure ring fastened to the shell structure on its end of greater internal diameter and having an internal thread adapted to mesh with the thread of said leadscrew, a piston-like insert element with an internal thread adapted to mesh with the thread of said leadscrew having an outer diameter dimensioned so as to slideably fit within the smaller bore of said shell structure with a step-like outwardly extending shoulder dimensioned to slideably fit within the greater bore of the shell enclosure and disposed in a spacial arrangement relatively to the face of the shoulder of said shell enclosure so as to define an annular diameter, a source of uncompressible fluid under pressure, means for admitting the fluid into said annular chamber to cause said fluid to exert a force upon the shoulders of said insert element and said shell structure in opposite axial directions so as to cause the threads of said insert element and of said closure ring to exert a wedging action upon the thread of said leadscrew and to cause linear motion of said insert element against the pressure of said fluid to be transmitted to said shell element due to the uncompressibility of the fluid contained in said annular chamber, sealing rings to prevent leakage of fluid from said annular chamber and keying means between said insert element and said shell structure permitting limited relative linear motion while preventing relative rotary motion of said insert element within said shell structure.

3. An hydraulic nut assembly for machines and the like adapted to linear travel in response to rotary motion of a leadscrew and comprising a hollow shell structure disposed substantially concentrically around said leadscrew and having a substantially cylindrical internal bore, a disk-like closure ring fastened to one end of the shell structure and having substantially in its center a smooth bore of a diameter slightly greater than the outside nominal diameter of said leadscrew, a piston-like insert element with an internal thread adapted to mesh with the thread of said leadscrew and having an outer diameter dimensioned so as to slideably fit within the bore of said shell structure, the face of said insert element closest to said closure ring being substantially plane and adapted to contact the internal face of said closure ring and its other face having an undercut so as to define one half of an annular chamber, another piston-like insert element with an internal thread also adapted to mesh with the thread of said leadscrew and having an outer diameter dimensioned so as to slideably fit within the bore of said shell structure, the face of said second insert element adjacent to the first insert element being also undercut so as to define the other half of an annular chamber and its other end being undercut to allow for an expansion coil spring inserted over it to hold said insert element in spaced relation, a source of uncompressible fluid under pressure, means for admitting the fluid under pressure, means for admitting the fluid into said annular chamber to make said fluid to force apart said insert elements in opposite axial directions so as to cause their thread to exert a wedging action upon the thread of said leadscrew and to cause linear motion of said insert elements to be transmitted to said shell structure in one direction through direct pressure upon said closure ring and in the other direction against the stiffness of said expansion spring, sealing rings to prevent leakage of fluid from said annular chamber and keying means between said insert elements and said shell structure permitting limited relative linear motion while preventing relative rotary motion of said insert elements within said shell structure.

4. An hydraulic nut assembly for machines and the like adapted to linear travel in response to rotary motion of a leadscrew and comprising a hollow shell structure disposed substantially concentrically around said leadscrew and having an internal bore delimited on both ends by inwardly extending shoulders, a disk-like closure ring fastened to one end of the shell structure and having substantially in its center a smooth bore of a diameter slightly greater than the outside nominal diameter of said leadscrew, two piston-like insert elements with an internal thread adapted to mesh with the thread of said leadscrew and having their outer diameters dimensioned so as to slideably fit within the bore of the shoulders of said shell structure, the adjacent faces of said insert elements having outwardly extending shoulders of a diameter dimensioned so as to slideably fit within the greater bore of said shell structure, the shoulders of said insert element and of said shell structure being in a spaced relation so as to define two annular chambers, a source of uncompressible fluid under pressure, means for admitting the fluid into said annular chambers to make said fluid to force said insert elements in closer proximity so as to cause their thread to exert a wedging action upon the thread of said leadscrew and to cause linear motion of said insert elements to be transmittted to said shell structure due to the uncompressibility of the fluid contained in said annular chambers, sealing rings to prevent leakage of fluid from said annular chambers, valving means to prevent transfer of fluid from one of said annular chambers to the other and keying means between said insert elements and said shell structure permitting limited relative linear motion while preventing relative rotary motion of said insert elements within said shell structure.

5. An hydraulic nut for machines and the like adapted to linear travel in response to rotary motion of a leadscrew and comprising a housing structure connected with said leadscrew for relative axial motion on relative rotation of said leadscrew with respect to said housing, a nut carried within said housing and axially slidable with respect to said housing, said nut having screw threads engaged with said leadscrew, means urging said nut axially against said leadscrew, and means restraining said nut from rotation relative to said housing, said means urging said nut axially against said leadscrew comprising a liquid pressure chamber on one side of said nut only, said chamber having liquid therein under pressure and directly operative to exert pressure on said nut in one axial direction only and sealing means preventing the escape of said liquid from said chamber.

6. An hydraulic nut for machines and the like adapted to linear travel in response to rotary motion of a leadscrew and comprising a housing structure connected with said leadscrew for relative axial motion on relative rotation of said leadscrew with respect to said housing, a pair of nuts carried within said housing and axially slideable with respect to said housing and each other, said nuts each having screw threads engaged with said leadscrew, means urging said nuts in opposite axial directions and against said leadscrew, and means restraining said nuts from rotation relative to said housing said urging means comprising a liquid pressure chamber intermediate said nuts, said chamber having liquid under pressure to exert pressure on said nuts and means preventing said liquid from escaping said chamber.

References Cited in the file of this patent

UNITED STATES PATENTS

| | | |
|---|---|---|
| 2,195,799 | Parsons | Apr. 2, 1940 |
| 2,320,353 | Ernst et al. | June 1, 1943 |
| 2,328,732 | McKinney | Sept. 7, 1943 |
| 2,337,223 | Armitage | Dec. 21, 1943 |
| 2,365,075 | Hassman | Dec. 12, 1944 |
| 2,791,128 | Geyer et al. | May 7, 1957 |